United States Patent [19]
Wu

[11] Patent Number: 5,471,125
[45] Date of Patent: Nov. 28, 1995

[54] AC/DC UNITY POWER-FACTOR DC POWER SUPPLY FOR OPERATING AN ELECTRIC MOTOR

[75] Inventor: Jian M. Wu, Rockford, Ill.

[73] Assignee: Danfoss A/S, Nordborg, Denmark

[21] Appl. No.: 303,373

[22] Filed: Sep. 9, 1994

[51] Int. Cl.$^6$ .................................................. H02P 5/34
[52] U.S. Cl. .......................... 318/803; 318/729; 318/762; 318/811
[58] Field of Search .................................... 318/757–762, 318/798–803, 806–811, 729

[56] References Cited

U.S. PATENT DOCUMENTS

| 4,319,177 | 3/1982 | Kawada et al. | 318/798 |
| 4,697,131 | 9/1987 | Schauder et al. | 318/762 |
| 4,761,600 | 8/1988 | D'Atro et al. | 318/762 X |
| 4,764,713 | 8/1988 | D'Atro | 318/798 X |
| 4,902,954 | 2/1990 | Oshima et al. | 318/798 X |
| 4,959,602 | 9/1990 | Scott et al. | 318/762 X |
| 5,070,290 | 12/1991 | Iwara et al. | 318/758 |
| 5,283,507 | 2/1994 | Stitt et al. | 318/376 |

Primary Examiner—David S. Martin
Attorney, Agent, or Firm—Lee, Mann, Smith, McWilliams, Sweeney & Ohlson

[57] ABSTRACT

A unity power factor power supply for an electric motor. A switch-mode circuit is employed which, in a first mode, transfers power from AC main to a constant voltage DC bus. In a second mode, power generated on the DC bus is fed back to the main power supply. The circuit of the invention automatically maintains the DC bus voltage constant and sets an adequate operation mode by processing the DC bus voltage signal. In both operation modes, the unity power factor and sinusoidal waveform of the AC main side are maintained.

5 Claims, 3 Drawing Sheets

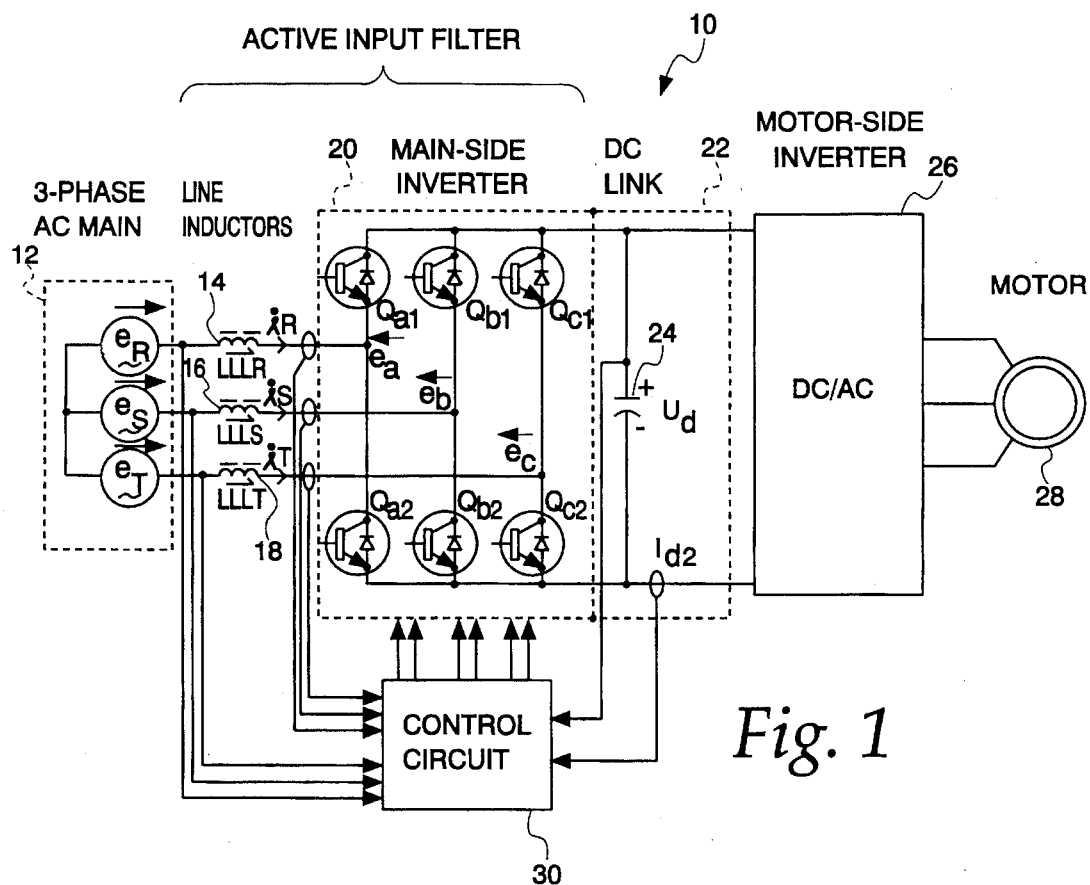
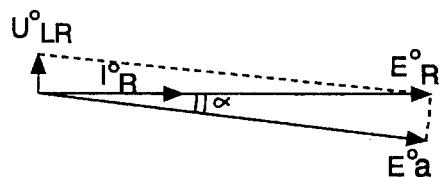
MOTORING
*Fig. 2a*
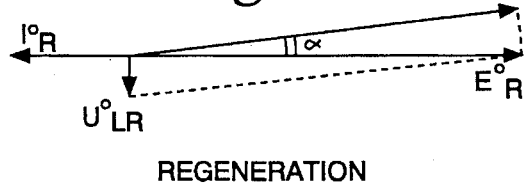
REGENERATION
*Fig. 2b*

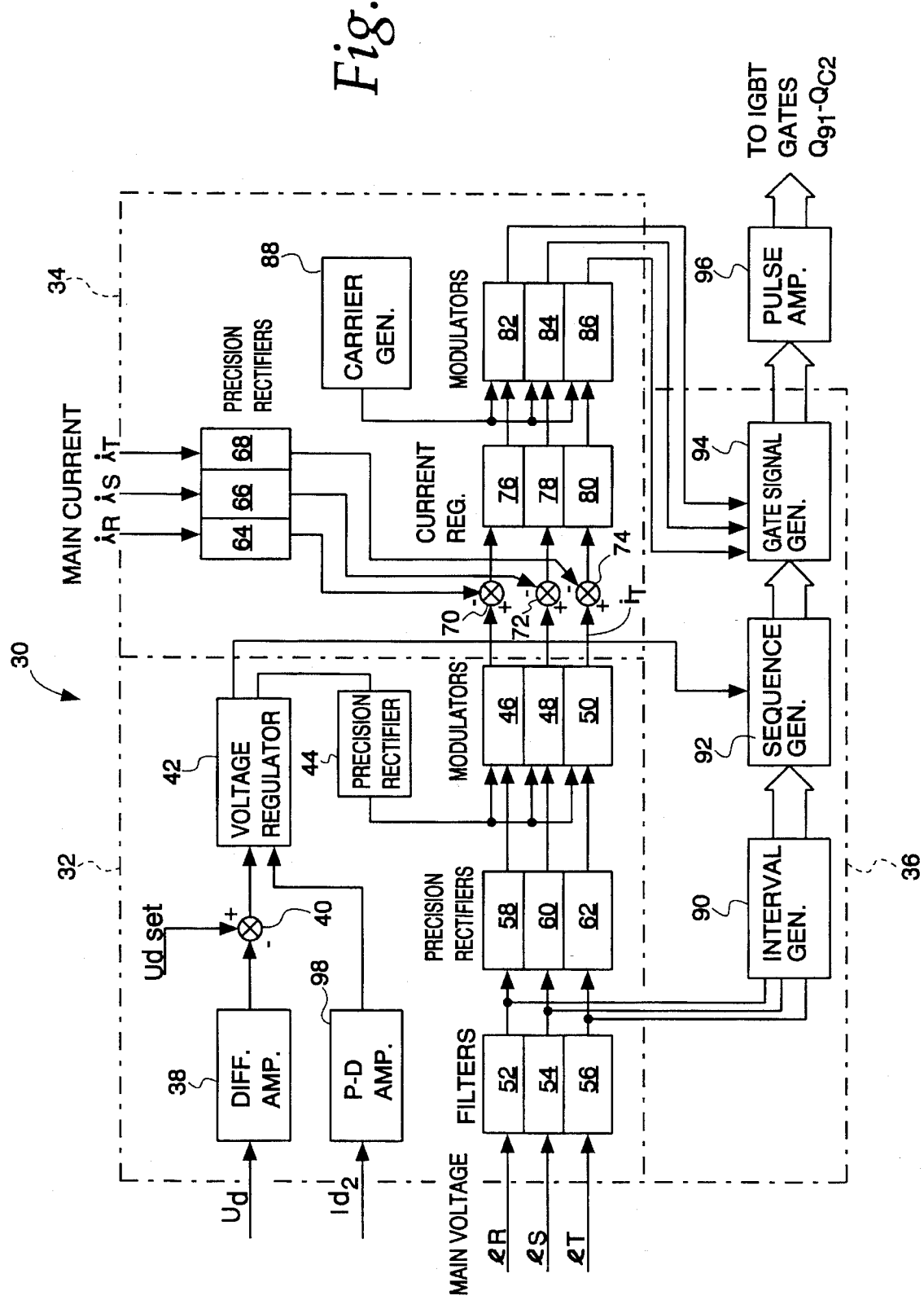

AC/DC UNITY POWER-FACTOR DC POWER SUPPLY FOR OPERATING AN ELECTRIC MOTOR

BACKGROUND OF THE INVENTION

This invention relates to maintaining a unity power factor in a power supply.

Published German Application No. 37 38 180 A1 discloses one circuit for maintaining a unity power factor in a device having a PWM-controlled power converter supplied through filter inductors from an AC main terminal. Power semiconductor switch devices are employed for delivering at a direct current link a voltage Ud across a filter capacitor for supply of the load connected thereto. A signal corresponding to the voltage control deviation is used as a current amplitude signal at the output of a voltage regulator, and is fed to a first input terminal of a multiplication circuit. A second input to the multiplication circuit is the main AC voltage signal, the multiplication of the two resulting in a current reference for each phase at the output of the multipliers. That output is compared with actual AC input current signal, and that output is delivered for operating switch devices in the power converter.

With such a circuit, it is assured that the current received from the AC main is of substantially sinusoidal waveform and is in phase with the AC main voltage, even if the load is inductive, thereby decreasing power loss and improving the power factor. The closer that the power factor is to one, the less the power loss.

During certain motor operations, such as braking, the motor runs as a generator. Therefore it is necessary to dissipate energy such as by means of a dynamic brake. One object of the present invention is to avoid the necessity of purchasing dissipator dynamic brakes or other means to dissipate inertial energy and to avoid large, costly magnetic coils to control harmonics. A control circuit is provided which allows mechanical energy from the motor shift side to be returned to the main power supply and still maintain a unity power factor and a sinusoidal current waveform.

SUMMARY OF THE INVENTION

The present invention comprises a switch-mode circuit, which in a first mode releases a switch pattern for operating semiconductor switches to transfer power from AC main to a constant voltage DC bus. Any load that needs a DC voltage source may be connected to the DC bus. In a second mode the circuit releases a second switch mode pattern in which the semiconductor switches are controlled so that power generated on the DC bus side is fed back to the main power supply. The circuit of the invention automatically maintains the DC bus voltage constant and sets an adequate operation mode by processing the DC bus voltage signal. In both operation modes, the unity power factor and sinusoidal current waveform of the AC main side are maintained.

BRIEF DESCRIPTION OF THE DRAWINGS

FIG. 1 is a circuit diagram of an active input filter including the control circuit with an inverter-motor system connected to its DC side according to the invention, FIG. 2a and FIG. 2b illustrate, respectively, a phase change diagram of the main voltage and current for one phase during utilization of the load as a motor and as a generator (e.g., during braking), FIG. 3 is a detailed diagram of the control circuit according to the invention.

DESCRIPTION OF AN EXAMPLE EMBODYING THE BEST MODE OF THE INVENTION

Figure 4A:
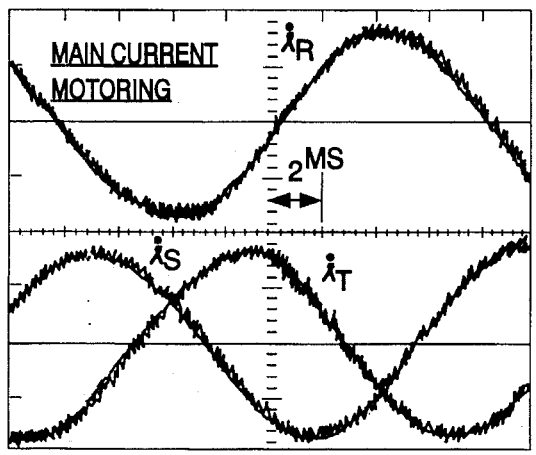
FIGS. 4a through 4f illustrate current wave forms in the motor and regeneration mode.

A circuit according to the invention is shown generally at 10 in FIG. 1. A three phase voltage source 12 supply three voltages $E_R$, $E_S$ and $E_T$ to respective inductors 14, 16 and 18 leading to a three phase power converter 20. As illustrated, each of the inductors 14, 16 and 18 is connected between a pair of semiconductor switches shown as IGBT's.

The output of the converter 20 is present at a DC link 22 and comprises a voltage Ud across a smoothing capacitor 24. The voltage is fed to a DC to AC inverter 26 for operation of a load 28, in this instance a motor. The output voltage and current from the link 22 are also connected to a control circuit 30 as illustrated in FIG. 3.

In the control circuit 30, a first portion 32 is that portion dealing with voltages, a second portion 34 deals with currents, and a third portion 36 generates a switching sequence and switching pattern control. In the first portion 32, the output voltage Ud is connected to a differential amplifier 38, the output of which is compared to a set reference value UdSet at junction 40. The deviation between those signals is processed by a voltage regulator 42 and is then used in a known manner as a current amplitude reference. The regulator 42 is connected to a precision rectifier 44, the output of which is a first input to each of three modulators 46, 48 and 50. Each of the three phases of voltage signals from the power supply 12 is also connected through respective input filters 52, 54 and 56 to respective precision rectifiers 58, 60 and 62, the outputs of which become the respective second inputs to the modulators 46, 48 and 50. The outputs of the modulators are used as current references to control the amplitude, waveform and phase angle of the AC current.

In the second portion 34, the respective current signals from the inductors 14 through 18 are passed through respective precision rectifiers 64, 66 and 68. The outputs of the rectifiers 64 through 68 are then compared with the corresponding current references at junctions 70 through 74. Their deviations are fed to respective current regulators 76, 78 and 80. The outputs of the regulators 76 through 80 then become first inputs to each modulator 82, 84 and 86 of a pulse width modulation circuit. The second input of each of the modulators 82 through 86 is from a carrier generator 88. Pulse-width signals for controlling the six IGBT's of the power converter 20 are the outputs of the three modulators 82 through 86. The motor current follows a sine wave due to current regulation and pulse-width modulation.

In the third portion 36, an interval generator 90 is connected to the main voltage, and is used to divide the period of each phase into six equal intervals, therefore into 60° sequences. The output of the interval generator 90 is connected to a sequence generator 92 in which gate signal patterns are created.

In each 60° interval, the corresponding IGBT is turned on or off or pulse-width modulated according to a first or a second switching pattern, depending on whether the load 28 is operated as a motor or a generator. The sequence of operation with the load 28 operating as a motor is set forth in the following Table A, while the sequence of operation with the load 28 operating as a generator is shown in the following Table B. The switching pattern is programmed and stored in the sequence generator 92, which is also controlled from the voltage regulator 42 for determining whether the load 28 is operated as a motor or as a generator. The output of the sequence generator 92 is connected to a gate signal generator 94 operated by the modulators 82 through 86. The output of the gate signal generator is directed to a pulse amplifier 96 to amplify the outputs, and respective outputs are then applied to the gates of the six IGBT's of the converter 20.

TABLE A

Motor

| Inter. | 0°–60° | 60°–120° | 120°–180° | 180°–240° | 240°–300° | 300°–360° |
|---|---|---|---|---|---|---|
| Qa1 | off | off | off | sw. | off | sw. |
| Qa2 | sw. | off | sw. | off | off | off |
| Qb1 | off | sw. | off | off | off | sw. |
| Qb2 | off | off | sw. | off | sw. | off |
| Qc1 | off | sw. | off | sw. | off | off |
| Qc2 | sw. | off | off | off | sw. | off |

TABLE B

Generator

| Inter. | 0°–60° | 60°–120° | 120°–180° | 180°–240° | 240°–300° | 300°–360° |
|---|---|---|---|---|---|---|
| Qa1 | sw. | on | sw. | off | off | off |
| Qa2 | off | off | off | sw. | on | sw. |
| Qb1 | off | off | sw. | on | sw. | off |
| Qb2 | on | sw. | off | off | off | sw. |
| Qc1 | sw. | off | off | off | sw. | on |
| Qc2 | off | sw. | on | sw. | off | off |

When the load 28 is operating as a motor, the gate signal generator 94 generates a switching pattern as shown in Table A for each of the six IGBT's. However, when the motor is braking, it begins to act as a generator, and the output voltage Ud tends to increase above the reference voltage UdSet. This situation is signaled by the voltage regulator 42. In this instance, the sequence generator 92 changes to the switch pattern for regeneration as shown in Table B. In this mode the generated current is 180° out of phase to the main voltage. Thus, the voltage Ud is always maintained constant. Logic circuits in the sequence generator 92 and gate signal generator 94 are used to determine which of the six IGBT's of the converter 20 are to be activated at any moment in time.

Returning to FIG. 3, the current Id2 is fed through an amplifier 98 to a feed-back input of the voltage regulator 42. This input serves to improve the dynamics of regulation and to modify the output of the voltage regulator 42 in case of an overload. During the transition between operation of the load 28 as a motor and its braking, when it become a generator, the change of polarity of the current Id2 is faster than the change of the voltage Ud. The current feed-back through the amplifier 98 increases system response and reduces any DC overshoot during the transition.

FIG. 2 illustrates phase diagrams for the main voltage and current, FIG. 2a being when the load 28 is operating as a motor, and FIG. 2b being when the load 28 is braking, and therefore operating as a generator. The curves are shown for only one of the phases, it being obvious that the curves for the other phases would be the same, but simply 120° out of phase with one another.

Figure 4B:
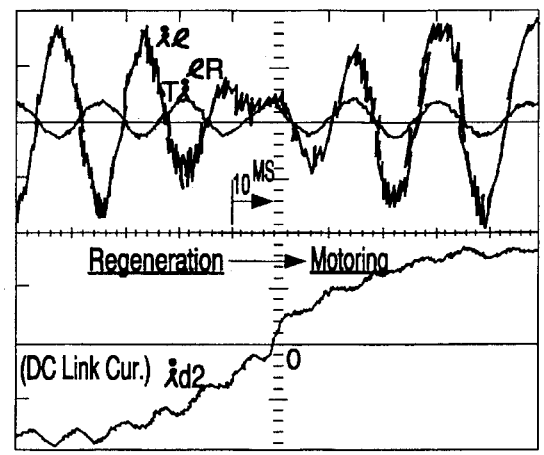
Figure 4C:
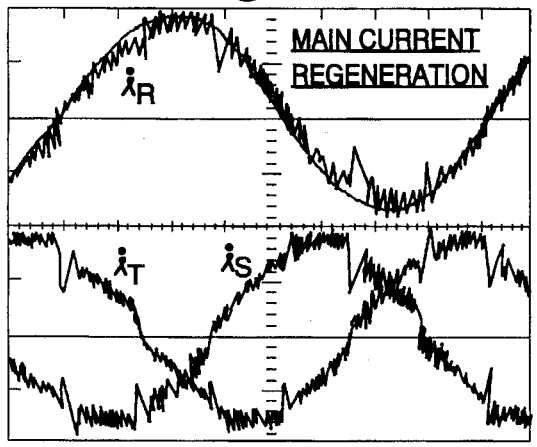
Figure 4D:
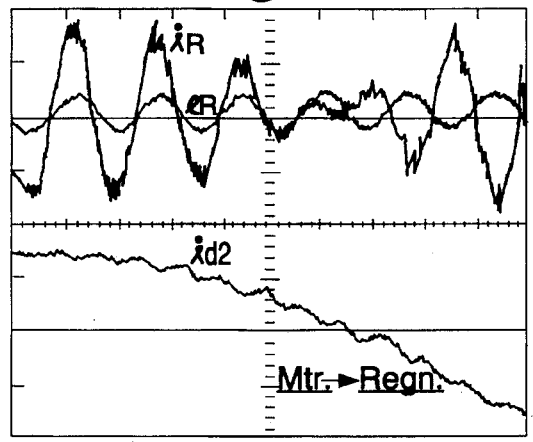
Figure 4E:
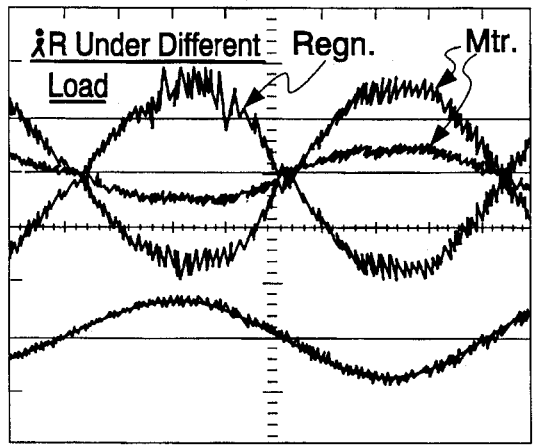
Figure 4F:
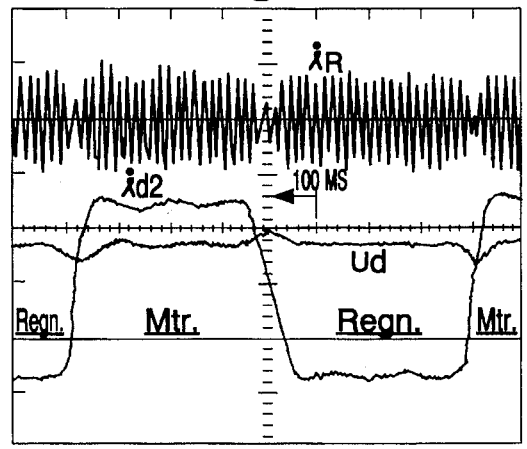

FIGS. 4a through 4f illustrate actual oscilloscope wave forms for the current and voltage during the motor and generator functions. In FIG. 4a, the phase relationship between the three phases of currents is illustrated. In FIG. 4b, the currents and voltages are shown for the phase R (of the three phases R, S and T), along with the DC load current being shown below. In the left hand portion of the figure is illustrated the regeneration mode (when the load 28 is operating as a generator, and the corresponding DC current is negative). As illustrated, the current and voltage are properly out of phase. When the load 28 is operated as a motor, the DC load changes its polarity and the phase relationship of the voltage and the current changes as shown in the right hand portion of FIG. 4b, where the current and voltage are in phase. FIGS. 4c through 4f illustrate other curves during motor and regeneration phases.

Various changes can be made to the invention without departing from the spirit thereof or scope of the following claims.

What is claimed is:

1. A unit power-factor direct current power supply for the supply of an inverter which operates a three phase motor load, said power supply having a pwm-controlled power converter supplied from a three phase alternating current source and comprising self-commutated semiconductor switch devices for delivering an output DC voltage for the supply of the load connected thereto, said converter having a control circuit comprising a voltage regulator having an input supplied with a signal representing a voltage deviation between a DC reference voltage and the output DC voltage and an output fed to a first input of three modulators as a current reference value, each of said modulators having a second input being connected to a sinusoidal phase voltage signal derived from the three phase alternating current source, said modulators having outputs comprising current reference signals, said current reference signals being applied to a gate signal circuit which includes means to produce firing pulses for operating switch devices of the converter, and including a sequence circuit connected to said gate signal circuit, said sequence circuit including means to allow the converter to operate in a first mode and a second mode depending on control deviation of said voltage regulator, the sequence circuit in the first mode generating a first switch pattern for controlling the switch devices to operate in a motor mode, the sequence circuit in the second mode generating a second switch pattern for controlling the switches in a generating mode, whereby in both modes currents of the three phase alternating current source are substantially sinusoidal, but in the second mode in a phase opposite to that of the voltages of the alternating current source, said second switch pattern being generated when the output DC voltage tends to rise above the DC reference voltage.

2. A power supply according to claim 1 in which the output from said voltage regulator is connected to said sequence circuit.

3. A power supply according to claim 1 including interval generator means providing an input to said sequence circuit, said interval generator means dividing each phase of said alternating current source into six equal intervals.

4. A power supply according to claim 1 including a pulse amplifier for amplifying said firing pulses.

5. A power supply according to claim 1 including an output filter capacitor, said DC voltage being delivered to said capacitor from said converter.

* * * * *